US011911789B2

(12) United States Patent
Uchino

(10) Patent No.: US 11,911,789 B2
(45) Date of Patent: Feb. 27, 2024

(54) MATERIAL APPLICATION DEVICE AND PUSHING MEMBER

(71) Applicant: THREEBOND CO., LTD., Tokyo (JP)

(72) Inventor: Ryohei Uchino, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 0 days.

(21) Appl. No.: 17/786,505

(22) PCT Filed: Nov. 2, 2020

(86) PCT No.: PCT/JP2020/041050
§ 371 (c)(1),
(2) Date: Jun. 16, 2022

(87) PCT Pub. No.: WO2021/131327
PCT Pub. Date: Jul. 1, 2021

(65) Prior Publication Data

US 2023/0026919 A1 Jan. 26, 2023

(30) Foreign Application Priority Data

Dec. 24, 2019 (JP) ................................ 2019-232748

(51) Int. Cl.
*B05C 5/02* (2006.01)
*B05C 17/01* (2006.01)
*B05C 17/015* (2006.01)

(52) U.S. Cl.
CPC .......... *B05C 5/0225* (2013.01); *B05C 17/015* (2013.01)

(58) Field of Classification Search
CPC .. B05C 11/1034; G01F 11/023; G01F 11/029; F15B 15/14; F15B 15/17; F15B 15/18; B01L 3/02; B01L 3/0217; B01L 3/0231
USPC ................................ 118/300; 222/309, 389
See application file for complete search history.

(56) References Cited

U.S. PATENT DOCUMENTS

2007/0068974 A1 3/2007 Tourigny
2013/0277457 A1* 10/2013 Mizuno .............. B05C 11/1034 239/337
2018/0221909 A1* 8/2018 Tudor .................. B05C 5/0225

FOREIGN PATENT DOCUMENTS

| | | | |
|---|---|---|---|
| CN | 108290324 | A | 7/2018 |
| JP | H10-5657 | A | 1/1998 |
| JP | H10-209632 | A | 8/1998 |
| JP | H11-235546 | A | 8/1999 |
| JP | 2007090345 | A | 4/2007 |
| JP | 2007-222768 | A | 9/2007 |
| JP | 2014-163372 | A | 9/2014 |
| JP | 2017-104821 | A | 6/2017 |

(Continued)

OTHER PUBLICATIONS

Ikushima, CN101674892, published Mar. 17, 2010 (Year: 2010).*

(Continued)

*Primary Examiner* — Yewebdar T Tadesse
(74) *Attorney, Agent, or Firm* — LUCAS & MERCANTI, LLP

(57) ABSTRACT

A material application device has a pushing part, and a driving part. The driving part includes a first driving part capable of imparting a driving force to the pushing part by a motor, and a second driving part capable of imparting a driving force to the pushing part by supplying a fluid into an inner space S isolated from the outside.

3 Claims, 8 Drawing Sheets

(56) References Cited

FOREIGN PATENT DOCUMENTS

JP 2018-020291 A 2/2018

OTHER PUBLICATIONS

International Search Report for the corresponding patent application No. PCT/JP2020/041050, dated Jan. 26, 2021, with English translation.

Office Action dated Mar. 29, 2023 for the corresponding Chinese patent application No. 202080088808.3, with English translation.

* cited by examiner

MATERIAL APPLICATION DEVICE AND PUSHING MEMBER

CROSS REFERENCE TO RELATED APPLICATION

This Application is a 371 of PCT/JP2020/041050 filed on Nov. 2, 2020 which, in turn, claimed the priority of Japanese Patent Application No. 2019-232748 filed on Dec. 24, 2019, both applications are incorporated herein by reference.

TECHNICAL FIELD

The present invention relates to a material application device and a pushing member.

BACKGROUND ART

Conventionally, there is a technique with which an adhesive agent filled inside a storage container such as a cartridge is discharged by exerting an external force on the storage container. In a conventional device related to such a technique, the device rotationally drives a piston shaft for pushing out a discharging material in a storage container, such as a syringe, using a motor and a ball screw, and pushes out the adhesive agent from the inside of the storage container to outside (see Patent Literature 1).

CITATION LIST

Patent Literature

Patent Literature 1: JP 10-5657 A

SUMMARY OF INVENTION

The present inventor focused on the fact that mounting and using such a material application device on a desk-top robot is difficult because the material application device of Patent Literature 1 is relatively heavy in weight, and has been eagerly conducting studies.

It is, therefore, an object of the present invention to suppress the weight of the material application device.

One aspect of the present invention for solving the above problem is a material application device. The material application device has a pushing part, and a driving part. The pushing part is configured to be able to discharge a material filled inside a storage container, from the storage container, by coming into contact with a plunger and pushing the plunger. The driving part imparts a driving force for moving the pushing part toward the plunger, and includes a first driving part and a second driving part. The first driving part is configured to be able to impart a driving force to the pushing part by a motor. The second driving part is configured to be able to impart a driving force to the pushing part by supplying a fluid into an inner space isolated from the outside. Moreover, one aspect of the present invention is a pushing member included in the material application device. The pushing part includes the pushing member, a sealing member, and a clamping member. The sealing member seals a gap between the plunger and a filling part that stores the material in the storage container. The clamping member is configured to clamp the sealing member together with the pushing member, and to be able to deform the sealing member outward in a radial direction by clamping the sealing member. The pushing member is configured to be able to come into contact with the plunger and be able to be fitted with the plunger, and has a hole in the middle.

DESCRIPTION OF EMBODIMENTS

Figure 1:
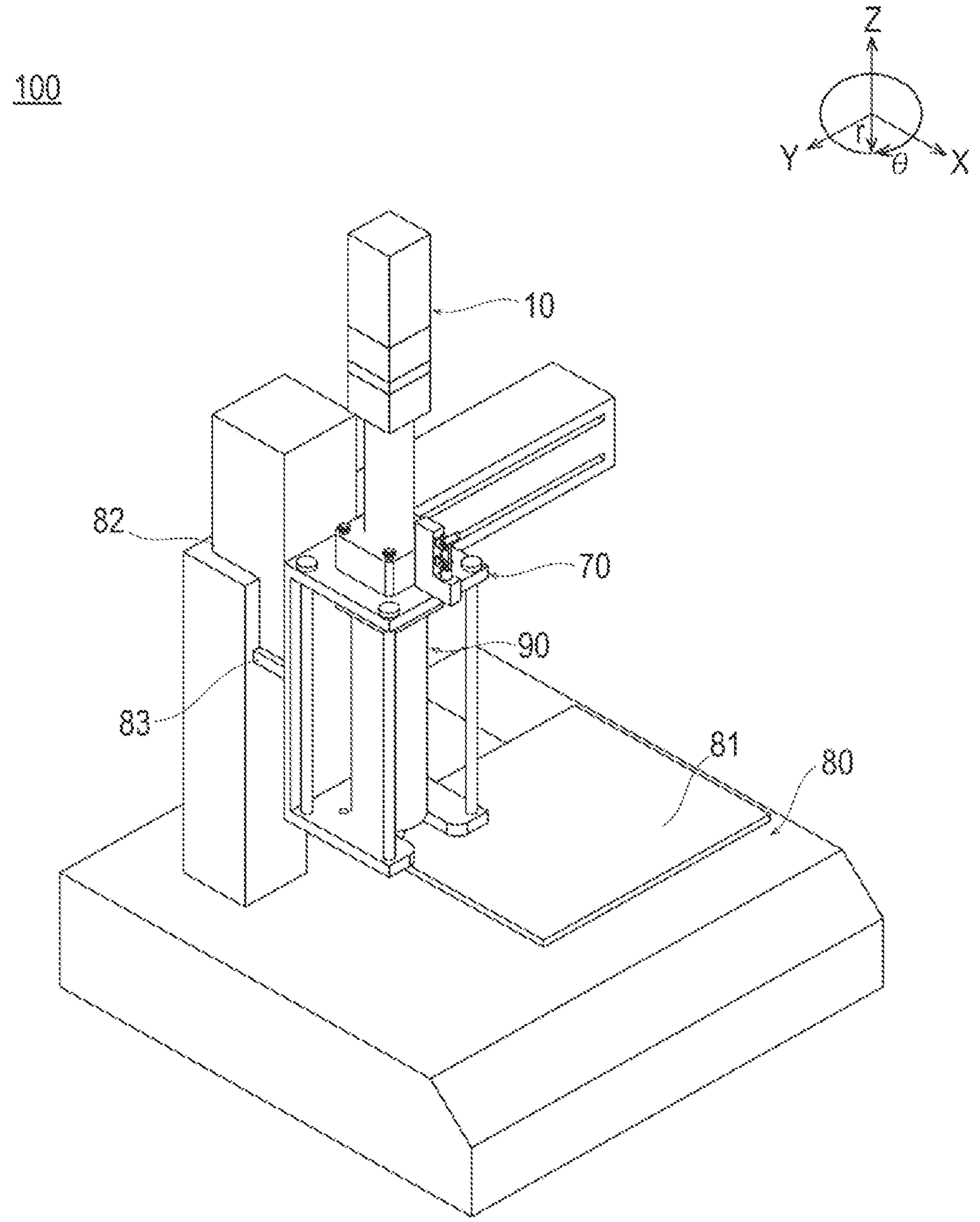
FIG. 1 is a perspective view illustrating a material application device according to an embodiment of the present invention.

Hereinafter, an embodiment of the present invention will be described with reference to the attached drawings. Note that the following description does not intend to limit the technical range and the meaning of terms described within the scope of claims. Moreover, the dimensional ratios in the drawings are exaggerated for convenience of explanation, and may differ from the actual ratios.

Note that, hereinafter, for descriptions using the drawings, a Cartesian coordinate system and a cylindrical coordinate system are shown in the drawings. X in the Cartesian coordinate system represents a direction in which a later-described mounting part moves, and is referred to as the depth direction X for convenience. Y is a moving direction of a second moving part 82 constituting a moving part 80, and is referred to as the width direction Y. Z is a height direction of a device, and is referred to as the height direction Z. In the cylindrical coordinate system, r is equivalent to a radial direction or a radiation direction of a ball screw 44 and a piston 46 having a substantially cylindrical shape, and is referred to as the radial direction r. θ is equivalent to a rotation direction or an angular direction of the ball screw 44, and is referred to as the rotation direction θ.

FIG. 1 to FIG. 7 are views provided for describing a material application device 100 according to an embodiment of the present invention. The material application device 100 according to the present embodiment is used, for example, when supplying materials, such as a moisture-curing resin, a UV-curing resin, and a thermosetting resin, as a sealing agent and an adhesive agent.

The range of viscosity of the sealing agent and the adhesive agent is preferably 20 to 1000 Pas, more preferably 50 to 500 Pas, and most preferably 75 to 350 Pas. Moreover, the thixotropic ratio of the sealing agent and the adhesive agent is preferably in a range of 1.0 to 5, more preferably in a range of 1.5 to 5, and most preferably in a range of 1.7 to 3.

Note that the thixotropic ratio is a property value indicating the ease of flow of a moisture-curing resin, and is defined by a ratio obtained by splitting the viscosity when the shear velocity is 1 (1/s) by the viscosity when the shear velocity is 10 (1/s) using a rheometer.

When roughly described with reference to FIGS. 1 and 2, the material application device 100 has: a dispenser 10 for discharging a material from a storage container 90; an installation part 70 for installing the storage container 90; and a moving part 80 for adjusting the relative positions of the dispenser 10 and a workpiece. The material application device 100 is used by attaching the storage container 90, and thereby is configured to discharge the material filled in the storage container 90 to outside. Detailed descriptions will be given below.

(Storage Container)

Figure 4:
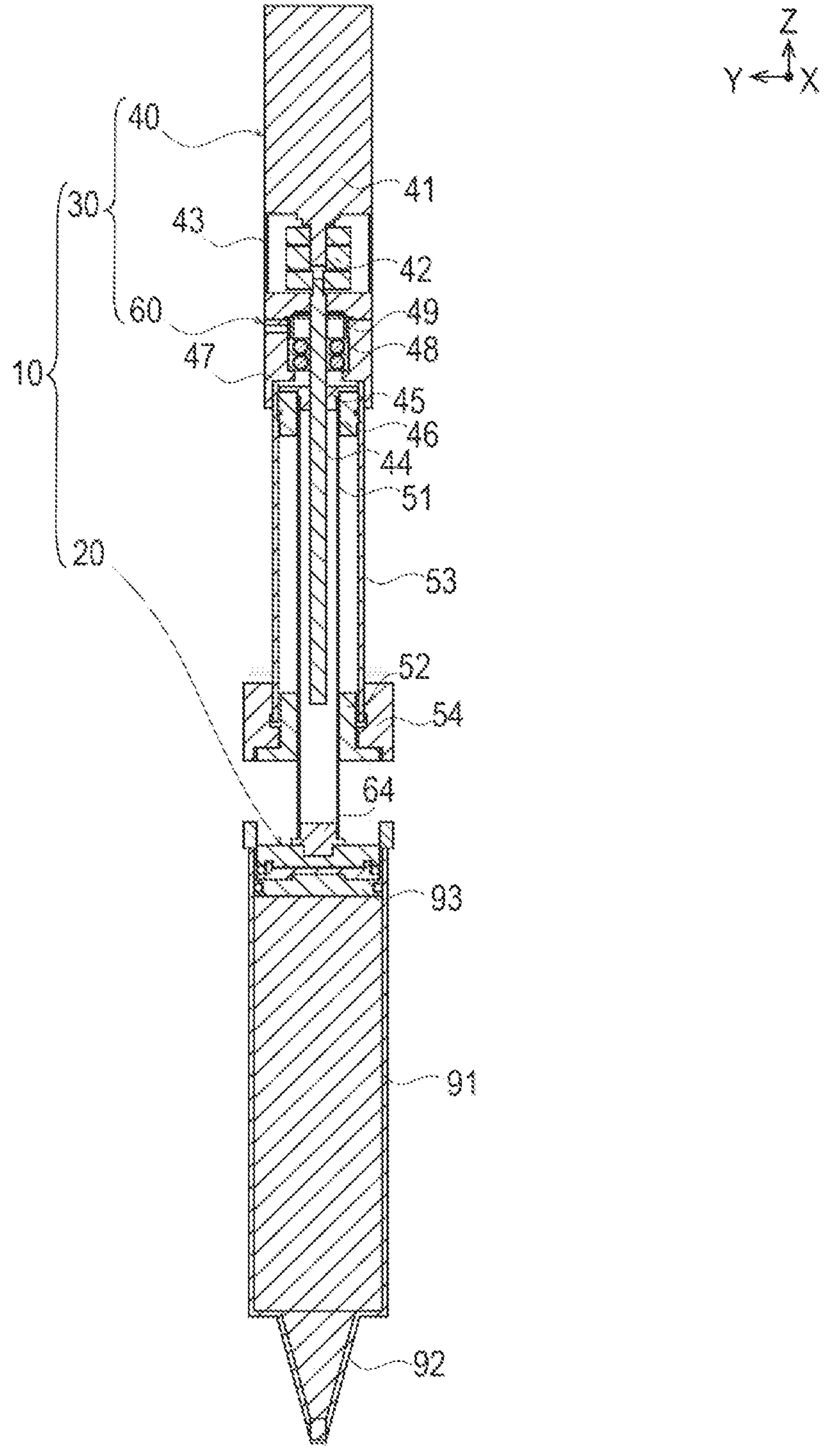
FIG. 4 is a sectional view along the longitudinal direction of a dispenser in FIG. 1.

First, the storage container 90 will be described. The storage container 90 is for storing a material to be applied to a workpiece, and a cartridge is employed as an example in the present embodiment. However, the storage container 90 is not limited to the above as long as the material can be reserved (stored), and it is possible to use, for example, a syringe other than the cartridge. As shown in FIG. 4 for example, the storage container 90 includes a filling part 91, a discharging part 92, and a plunger 93.

The storage container 90 is formed into a substantially cylindrical shape, for example, in the present embodiment. However, the specific shape is not limited to a cylinder as long as it is possible to store and discharge the material to outside, and the storage container 90 may be formed into a polyhedron such as a hexahedron. The filling part 91 is configured to have a hollow cylindrical inner space, and to store (fill with) the material inside the inner space.

As one example, the discharging part 92 is configured by forming a portion which is equivalent to the bottom surface of the cylindrical shape into a substantially cone shape, and making a hole at the tip of the cone shape. However, the discharging part 92 is not limited to the above as long as the material filled in the filling part 91 can be discharged, and may be configured by making a hole on the bottom surface of a polygonal body such as a hexagonal body instead of the cone shape. Moreover, an on-off valve such as a needle valve for switching between on and off of discharging the material may be attached to the discharging part 92.

The plunger 93 is disposed on the opposite side to the discharging part 92 in the longitudinal direction of the cylindrical shape. The filling part 91 is configured by cutting out at least a portion of the bottom surface of the cylindrical shape so as to be able to store the material in the inner space. The plunger 93 is movably disposed in a position where at least a portion of the bottom surface is cut out as described above in the cylindrical shape. Moreover, the plunger 93 is formed into a cylindrical shape matching to the inside surface of the filling part 91, and a sealing member such as an O-ring is set on the outside surface. Consequently, when the plunger 93 is moved toward the discharging part 92 in a state in which the material is stored in the filling part 91, the material filled in the filling part 91 is gathered in the discharging part 92, and is discharged from the discharging part 92 to outside.

(Dispenser)

As shown in FIG. 4, the dispenser 10 includes a pushing part 20, and a driving part 30.

(Pushing Part)

Figure 7:
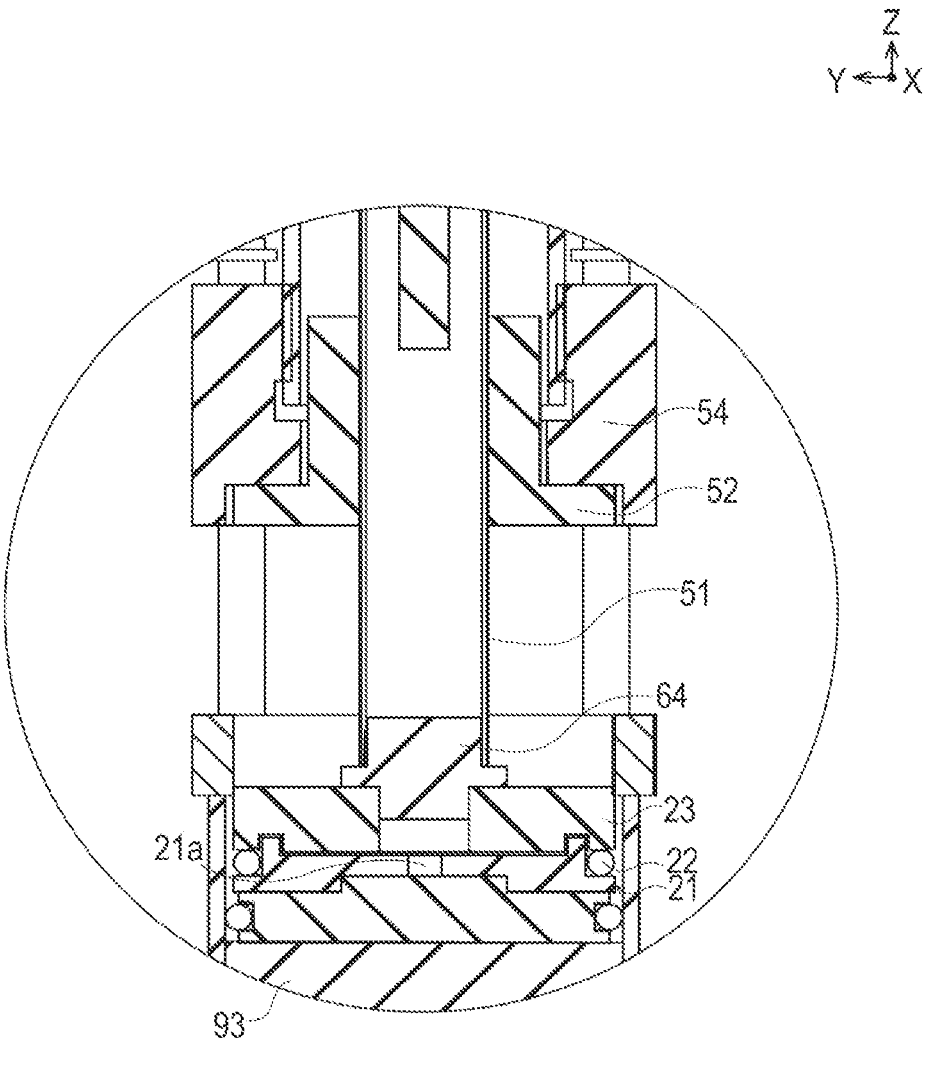
FIG. 7 is an enlarged view of the vicinity of a pusher constituting the material application device in FIG. 4.

The pushing part 20 is configured to come into contact with the plunger 93 constituting the storage container 90, and to push the plunger 93 so as to enable the material filled in the filling part 91 to be discharged from the discharging part 92 of the storage container 90. As shown in FIG. 7, the pushing part 20 includes a pusher 21 (equivalent to the pushing member), a sealing member 22, and a clamping member 23.

The pusher 21 is configured to be able to come into contact with the plunger 93. The pusher 21 is configured into a substantially disc shape similar to the shape of the plunger 93 of the storage container 90. However, the specific shape of the pusher 21 is not limited to the disc shape as long as the pusher 21 can push the plunger 93. For example, the pusher 21 may be configured into a hexahedron or a rectangular parallelepiped shape other than the above-mentioned shape. As shown in FIG. 7, the pusher 21 is configured to have a recess that fits with a protruding shape of the plunger 93. A hole 21*a* is provided in the middle of the bottom surface of the recess.

The sealing member 22 is configured to seal the gap between the plunger 93 and the filling part 91 storing the material in the storage container 90. The sealing member 22 is configured to be clamped by the pusher 21 and the clamping member 23 in the height direction Z, and to be crushable. By causing the pusher 21 and the clamping member 23 to approach each other in the height direction Z, the sealing member 22 is compressed in the height direction Z, expands in the radial direction r, and contacts the inner wall surface of the filling part 91, thereby enabling formation of a sealed portion.

The clamping member 23 is disposed adjacent to the sealing member 22, and is configured to deform the sealing member 22 outward in the radial direction r by clamping the sealing member 22 together with the pusher 21. The clamping member 23 is configured into a substantially disc shape similar to the pusher 21. In the present embodiment, the sealing member 22 is clamped by the pusher 21 and the clamping member 23 in a state in which the sealing member 22 is set in a groove provided on the outer periphery of the pusher 21. However, the groove may be formed on the clamping member, or on both the pusher and the clamping member, as long as the sealed portion can be formed by compressing the sealing member 22 in the height direction Z.

(Driving Part)

The driving part 30 is configured to impart a driving force for moving the pushing part 20 toward the plunger 93. As shown in FIG. 4, the driving part 30 includes a first driving part 40, and a second driving part 60.

(First Driving Part)

As shown in FIG. 4, the first driving part 40 includes a motor 41, a coupling 42, a coupling case 43, a ball screw 44, a nut 45, a piston 46, a bearing case 47 (equivalent to a first case), a bearing 48, and a retainer 49. The first driving part 40 has a spline member 51, a spline receiving member 52, a cylinder tube 53 (equivalent to a tube), and a case member 54.

The motor 41 is configured to impart a driving force for rotating the ball screw 44. The first driving part 40 is configured to impart the driving force to the pushing part 20 by the motor 41. The motor 41 is not particularly limited as long as the motor 41 can impart a rotation force to the ball screw 44, and examples can include a linear motor, a servo motor, and a stepping motor.

The coupling 42 is configured into such a shape that is made by splitting a hollow cylindrical shape in an angular direction, and is configured to enable insertion of the shaft of the motor 41 and the shaft of the ball screw 44 into the inner space. The coupling 42 is configured to be able to transmit the rotation force from the motor 41 to the ball screw 44 by fastening the circular arc shapes split using a screw or the like in a state in which the shafts of the motor 41 and the ball screw 44 are inserted in the inner space. With the use of the coupling 42, it is possible to absorb the misalignment of the shafts of the motor 41 and the ball screw 44.

The coupling case 43 surrounds the coupling 42 in the depth direction X and the width direction Y of the coupling 42 so as to accommodate the coupling 42.

The ball screw 44 is configured into a long shape, and a thread to be screwed with the nut 45 is formed on the outside surface. The ball screw 44 is configured to rotate by receiving the rotation of the motor 41 through the coupling 42, and thereby be able to move the nut 45 in the height direction Z.

The nut 45 is attached by being screwed on the outside surface of the ball screw 44, and is configured to be movable in the height direction Z, equivalent to the longitudinal direction of the ball screw 44, by the rotation of the ball screw 44.

Figure 6:
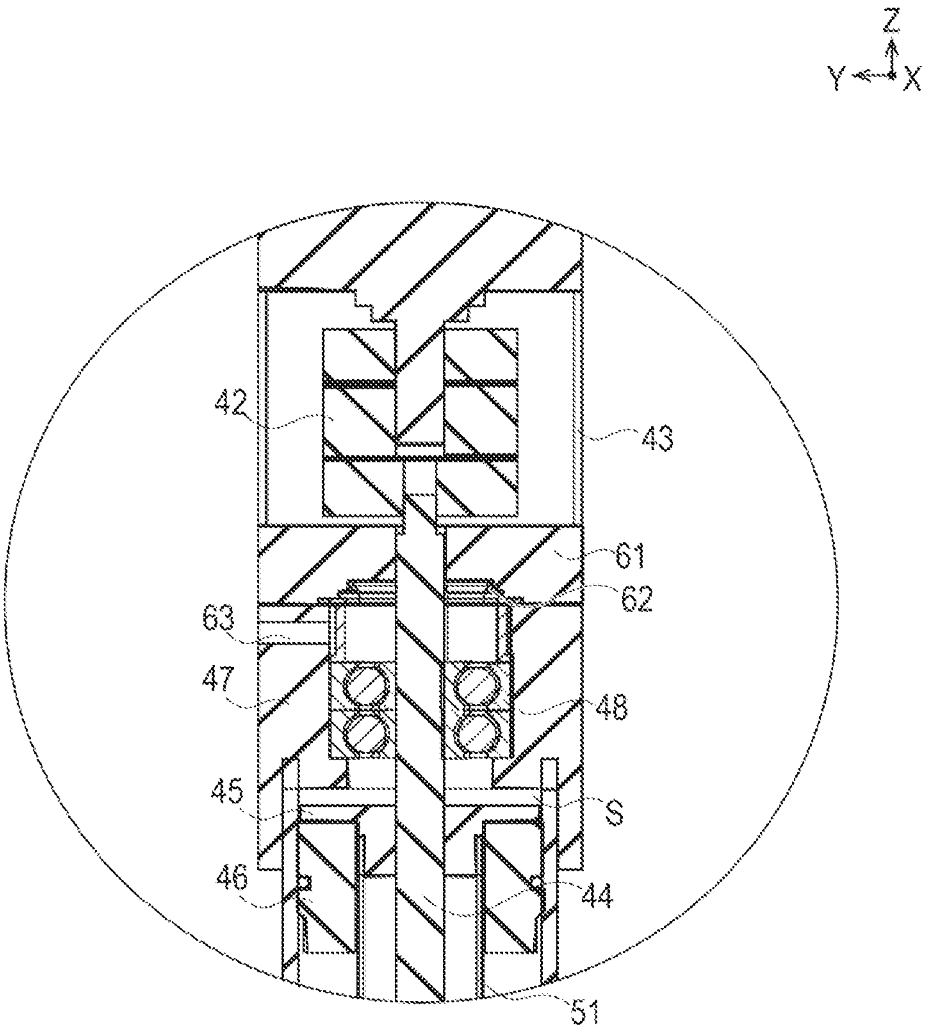
FIG. 6 is an enlarged view of the vicinity of a bearing case constituting the material application device in FIG. 4.

As shown in FIG. 6, the piston 46 is disposed adjacent to the nut 45 in the height direction Z, and is configured to be connected to the nut 45 with a bolt or the like. The piston 46 is accommodated in an inner space S formed in a state in which the bearing case 47 and the cylinder tube 53 are connected, and is configured to be movable in the height direction Z together with the nut 45 and the spline member 51 by the rotation of the ball screw 44. The piston 46 also constitutes the second driving part 60.

The bearing case 47 has a hole 63 which allows rotation and insertion of the ball screw 44 therethrough and provides communication from the outside to the inner space S. The bearing case 47 also constitutes the second driving part 60 as described later. The bearing case 47 is configured into a hollow shape to enable installation of the bearing 48 therein.

The bearing 48 is installed in the inner space of the bearing case 47, and is configured to allow rotation and insertion of the ball screw 44 therethrough. The retainer 49 is disposed adjacent to the bearing 48 in the height direction Z (axial direction) so as to hold the bearing 48 in the bearing case 47.

Figure 5:
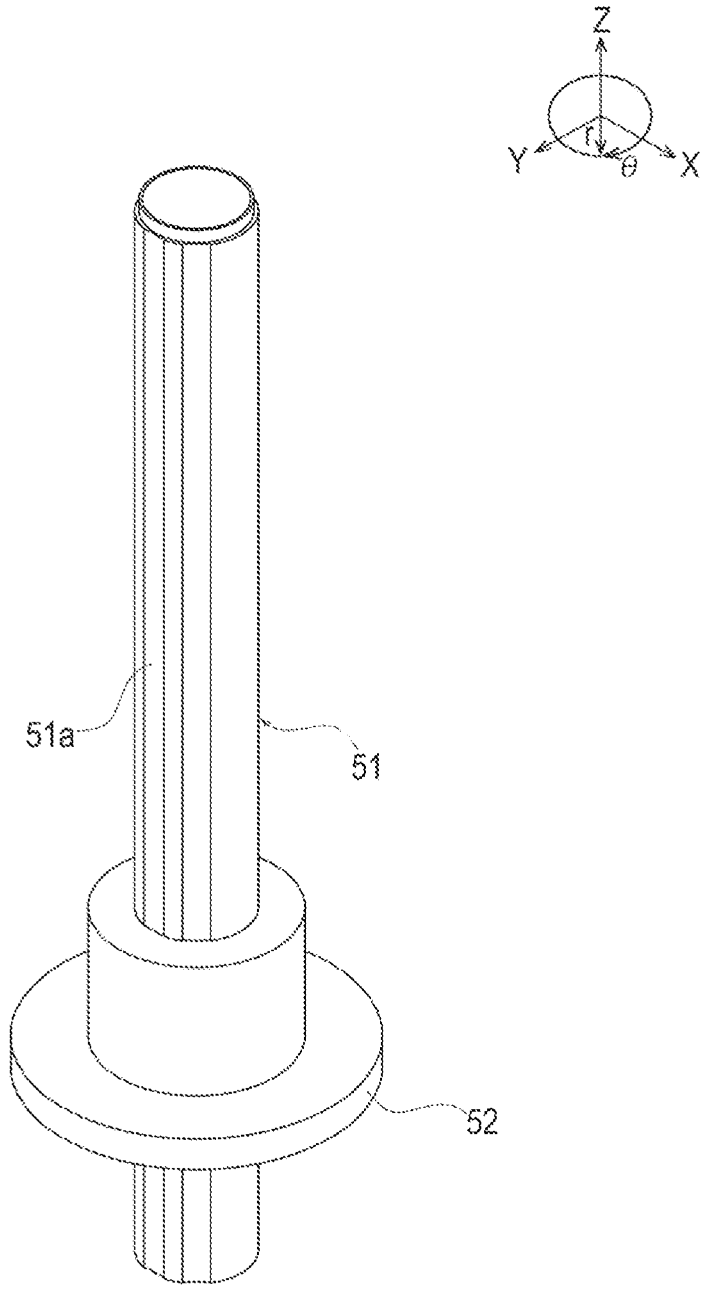
FIG. 5 is a perspective view illustrating a spline member constituting the dispenser.

The spline member 51 is configured to be coupled with the pushing part 20 through a plug member 64. As shown in FIG. 5, the spline member 51 has a recessed groove 51*a* formed on the outside surface, and is configured to move in the height direction Z together with the nut 45 and the piston 46, in accordance with the rotation of the ball screw 44, and thereby be able to move the pushing part 20.

The spline receiving member 52 has a hole in which the spline member 51 is insertable, and is fixedly installed. The spline receiving member 52 is also called a nut, and is configured to have a protruding portion which is fitted into the groove 51*a* of the spline member 51, and protrudes inward in the radial direction r.

The cylinder tube 53 is disposed adjacent to the bearing case 47, and is configured to include a hollow shape connectable to the bearing case 47. The cylinder tube 53 is disposed outside in the radial direction r of the ball screw 44 and the spline member 51. The cylinder tube 53 is configured to accommodate the ball screw 44 and the spline member 51 operably in the inner space. The case member 54 is configured as a member for fixedly installing the spline receiving member 52. The cylinder tube 53 and the spline member 51 also constitute the second driving part 60.

(Second Driving Part)

The second driving part 60 is configured to be able to impart a driving force to the pushing part 20 by supplying a fluid into the inner space S isolated from the outside. As shown in FIGS. 6 and 7, the second driving part 60 includes a packing case 61, a packing 62, a hole 63, and a plug member 64. In the present invention, although the fluid can adopt air, liquid, etc., the fluid is preferably air because a weight saving of device can be realized.

The packing case 61 is disposed between the coupling case 43 and the bearing case 47 in the height direction Z. The packing case 61 is configured to have a hollow space for installing the packing 62 and the retainer 49. The packing case 61 may be configured integrally with the coupling case 43 and the bearing case 47. Either case in which the packing case 61, the coupling case 43, and the bearing case 47 are configured separately, or integrally can be referred to as the case member in the present description. As shown in FIG. 6 for example, the case member has the hole 63 for introducing the fluid from the outside, and the inner space S for operating the pushing part 20 by the fluid pressure. In other words, the second driving part 60 also includes the case member such as the bearing case 47, the cylinder tube 53, and the spline member 51 as components. The fluid pressure is not particularly limited, but is preferably in a range of 0.01 to 0.8 MPa.

The hole 63 is configured to allow the fluid, such as air, to flow from a supply source, such as a compressor installed separately from the material application device 100, into the device through a pipe. The second driving part 60 rotates the ball screw 44 so as to move the piston 46 in the height direction Z by the circulation of the fluid into the inner space S from the hole 63. Although the hole 63 is provided in the bearing case 47 in the present embodiment, the location where a fluid path is to be formed is not necessarily the bearing case as long as the nut 45, the piston 46, and the spline member 51 are movable in the height direction Z with the supply of the fluid.

The plug member 64 is installed at an end, in the height direction Z, in the inner space of the spline member 51. The fluid flowing from the hole 63 is filled into the inner space S at the connection part between the bearing case 47 and the cylinder tube 53 as shown in FIG. 6. The nut 45 and the piston 46 can be disposed in the inner space S at the connection part between the bearing case 47 and the cylinder tube 53. By filling the fluid into the inner space S, the ball screw 44 rotates so as to move the nut 45, the piston 46, and the spline member 51 in the height direction Z.

The fluid flowing from the hole 63 is also filled into the inner space of the spline member 51 through the ball screw 44, in addition to the inner space S. The plug member 64 is provided to prevent the fluid filled in the inner space of the spline member 51 from leaking to outside, and thereby to prevent the leakage from obstructing the movement of the nut 45, the piston 46 and the spline member 51 in the height direction Z. Thus, the plug member 64 is configured to prevent the fluid flowed through the hole 63 from leaking from the inner space of the spline member 51 to outside.

Moreover, since the plug member 64 is installed at the end of the spline member 51, the pusher 21 moves together with the clamping member 23 in the height direction Z as the spline member 51 moves in the height direction Z. The plug member 64 is attached by, for example, being fitted with the clamping member 23 on the opposite side to the side attached to the spline member 51 in the height direction Z. Thus, the movement of the spline member 51 in the height direction Z is transmitted through the plug member 64 to the clamping member 23 and the pusher 21.

(Installation Part)

Figure 2:
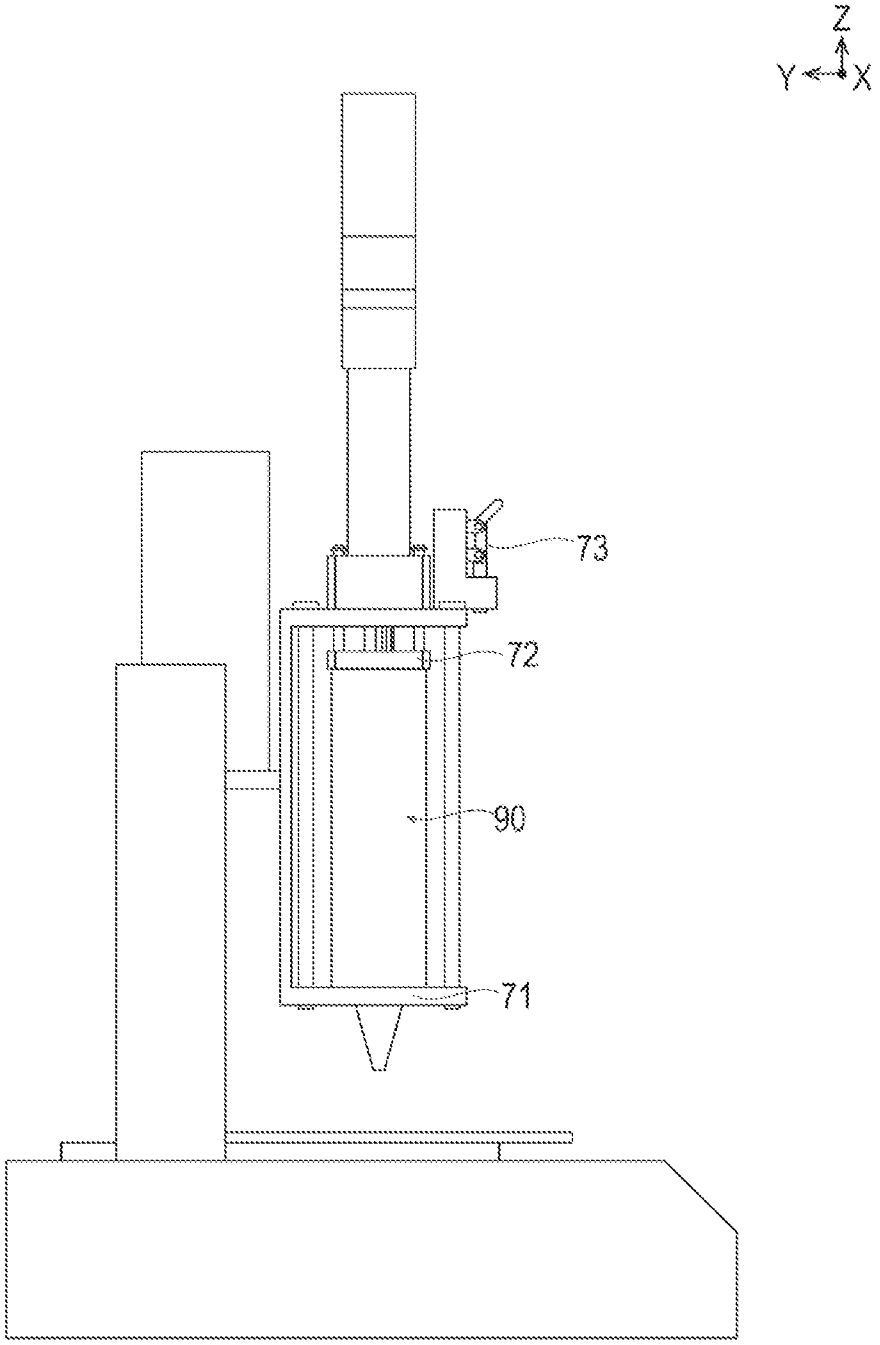
FIG. 2 is a front view (or a side view) of FIG. 1.
Figure 3:
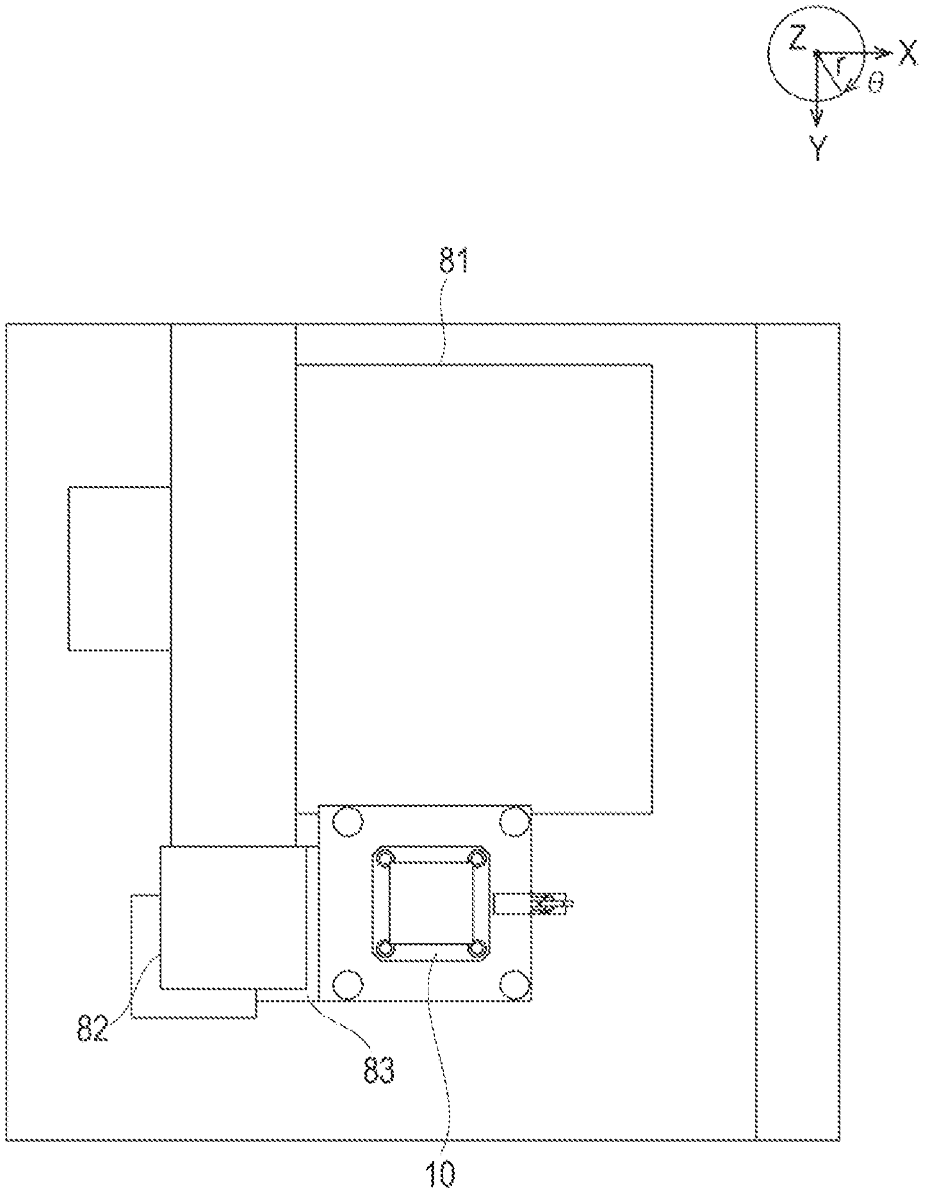
FIG. 3 is a plan view of FIG. 1.

As shown in FIG. 2, the installation part 70 includes a mounting part 71, a holding part 72, and a lever 73. The mounting part 71 is a location where the storage container 90 is mounted, and is configured to mount a lower end equivalent to a portion of the storage container 90 in the height direction Z thereon. The holding part 72 is configured to be movable up and down in the height direction Z by the operation of the lever 73. The storage container 90 can be clamped and fixed by the holding part 72 and the mounting part 71. The lever 73 is configured to be rotatable at a predetermined location as a starting point, and thereby be able to move the holding part 72 up and down.

(Moving Part)

The moving part 80 is configured as a machine capable of relatively moving the pushing part 20 and the driving part 30 with respect to a workpiece onto which the material is to be applied. As shown in FIG. 1, the moving part 80 includes a first moving part 81, a second moving part 82, a third moving part 83, and an operation part (illustration of which is omitted). The pushing part 20 and the driving part 30 are configured to be movable in three directions: the depth direction X, the width direction Y, and the height direction Z in the Cartesian coordinate system by being mounted on the moving part 80 including the first moving part 81, the second moving part 82, and the third moving part 83.

The first moving part 81 includes a stage for placing a workpiece, and a motor, not shown, for moving the stage in the depth direction X. The second moving part 82 includes a motor, not shown, for moving the dispenser 10, the installation part 70, and the storage container 90 in the width direction Y. The third moving part 83 secures the dispenser 10, the installation part 70, and the storage container 90, and includes a motor, not shown, which moves in the height direction Z together with the dispenser 10, the installation part 70, and the storage container 90. Thus, the workpiece placed on the placement table is movable in the depth direction X, and the dispenser 10 installed on the third moving part 83 moves in the height direction Z, and is also movable in the width direction Y along a rail. The installation form of the first moving part to the third moving part is not particularly limited to FIG. 1 and the like as long as the positional relationship between the dispenser 10 and the workpiece is adjustable. In other words, the pushing part and the driving part may be mounted on a 6-axis vertical articulated type robot (moving part) other than a so-called Cartesian coordinate system robot (moving part) shown in the drawings.

The operation part receives an instruction from a user through a combination of a plurality of buttons pressable by the user and a lever, or a touch panel and the like.

(Material Application Method)

Next, a material application method using the material application device 100 according to the present embodiment will be described. First, the user installs the storage container 90 on the mounting part 71 of the installation part 70, and operates the lever 73 to cause the holding part 72 to approach the mounting part 71, and to bring the storage container 90 into a state in which the storage container 90 is clamped by the mounting part 71 and the holding part 72.

Next, a workpiece is placed on the first moving part 81 of the moving part 80. Subsequently, the positional relationship between the workpiece and the dispenser 10 is adjusted by operating the operation part. Specifically, the position relative to the dispenser 10 in the depth direction X is adjusted by moving the first moving part 81. Similarly, the second moving part 82 and the third moving part 83 are moved to adjust the positional relationship between the dispenser 10 and the first moving part 81 in the width direction Y and the height direction Z.

Next, a compressor or the like is driven to cause a fluid, such as air, to flow through the hole 63. Then, the motor 41 is operated. The fluid having flowed through the hole 63 causes the ball screw 44 to rotate, and causes the nut 45, the piston 46, and the spline member 51 to move downward in the height direction Z. Moreover, the ball screw 44 is also caused to rotate by the motor 41, and to move the nut 45, the piston 46, and the spline member 51 in the height direction Z similarly to the above. The air and the motor 41 cause the pushing part 20 to move downward in the height direction Z, and to move the plunger 93 downward. Consequently, the material is discharged from the discharging part 92 to outside. Thus, the nut 45, the piston 46, and the spline member 51 are moved by the supply of the fluid from the hole 63, and the movement speed of the nut 45, the piston 46, and the spline member 51 can be adjusted by adjusting the operation of the motor 41.

When the supplied amount of the material from the dispenser 10 reaches a specified amount, the operation part is operated to stop the supply of the fluid from the hole 63, and to stop the rotation of the motor 41. Consequently, discharging of the material from the discharging part 92 is interrupted or finished.

As described above, the material application device 100 according to the present embodiment has the pushing part 20, and the driving part 30. The pushing part 20 is configured to come into contact with the plunger 93, and push the plunger 93, and thereby be able to discharge from the storage container 90 the material filled in the storage container 90. The driving part 30 is configured to impart the driving force for moving the pushing part 20 toward the plunger 93. The driving part 30 includes the first driving part 40, and the second driving part 60. The first driving part 40 is configured to be able to impart the driving force to the pushing part 20 by the motor 41. The second driving part 60 is configured to be able to impart the driving force to the pushing part 20 by supplying the fluid into the inner space S isolated from the outside.

With such a configuration, it is not necessary to ensure thrust, which is needed for pushing the plunger, by only the motor and the ball screw etc., and it is possible to suppress the whole device from become heavier in weight. Note that the weight mentioned here means the weight which does not include the weight of compressor or the like connected to the hole 63. Moreover, unlike the above-described device, if the storage container is pressurized by only the fluid such as air, when the temperature of the air changes, the viscosity of a liquid agent may change, and the discharged amount may vary. In a case in which the plunger is pushed by an electric actuator, it is difficult to mount and use the device on a desk-top robot as the electric actuator is relatively large and heavy. According to the material application device 100 of the present embodiment, by using both air and the motor 41 as described above, it is possible to reduce the influence of a temperature change on the discharged amount. Specifically, with the use of only air, it is known that the discharged amount at 40° C. is increased by 60% or more compared to the discharged amount at 20° C., and that influence of a temperature change on the discharged amount is larger. On the other hand, in the case in which both air and the motor are used, the change in the discharged amount at 40° C. is less than 5% compared to the discharged amount at 20° C., and it can be considered that influence of the temperature change on the discharged amount is smaller, and the discharged amount is stable. Furthermore, it seems promising to use both air and the motor to suppress the whole device from becoming gigantic. Here, the device becoming gigantic means, for example, that the space occupied by the device becomes relatively large in the plan view of the device.

The first driving part 40 includes the ball screw 44, the nut 45, and the spline member 51. The ball screw 44 rotates by receiving the rotation of the motor 41. The nut 45 is screwed with the ball screw 44, and is configured to be movable in the height direction Z, which is equivalent to the longitudinal direction of the ball screw 44, by the rotation of the ball screw 44. The spline member 51 is configured to be coupled with the pushing part 20, and be movable in the height direction Z together with the nut 45. With such a configuration, it is possible to drive the pushing part 20 by the rotation of the motor 41.

The second driving part 60 includes the bearing case 47, the cylinder tube 53, and the piston 46. The bearing case 47 is formed into a hollow shape with the hole 63 which provides communication from the outside to the inside, and allows rotation and insertion of the ball screw 44 therethrough. The cylinder tube 53 is disposed adjacent to the bearing case 47, and is configured to be connectable to the bearing case 47. The piston 46 is connectable to the nut 45, and is accommodated in the inner space S in a state in which the bearing case 47 and the cylinder tube 53 are connected. The piston 46 is configured to be movable in the height direction Z together with the nut 45 and the spline member 51 by the rotation of the ball screw 44. The second driving part 60 rotates the ball screw 44 so as to move the piston 46 in the height direction Z by the circulation of the fluid into the inner space S from the hole 63. With such a configuration, it is possible to drive the pushing part 20 by the fluid having circulated from the outside through the hole 63.

The dispenser 10 including the pushing part 20 and the driving part 30 is mounted on the moving part 80 including the first moving part 81, the second moving part 82, and the third moving part 83 as a machine that can be relatively moved with respect to a workpiece onto which the material is to be applied. With such a configuration, it is possible to limit the weight of the device, and the moving part 80 on which the dispenser 10 is mounted can be used as a relatively small desk-top robot. The desk-top robot in the present description means a mechanical device that does not require the moving part 80 to have an additional table for placing a workpiece.

The pushing part 20 includes the pusher 21, the sealing member 22, and the clamping member 23. The pusher 21 is configured to be able to come into contact with the plunger 93. The sealing member 22 seals the gap between the plunger 93 and the filling part 91 storing the material in the storage container 90. The clamping member 23 is configured to clamp the sealing member 22 together with the pusher 21, and to be able to deform the sealing member 22 outward in the radial direction r by clamping the sealing member 22. The pusher 21 is configured to be able to be fitted with the plunger 93, and to have the hole 21*a* in the middle. With such a configuration, it is possible to fit the pusher 21 with the plunger 93, and prevent the pusher 21 from becoming unremovable from the plunger 93 due to occurrence of negative pressure when removing the pusher 21 from the plunger 93.

Figure 8:
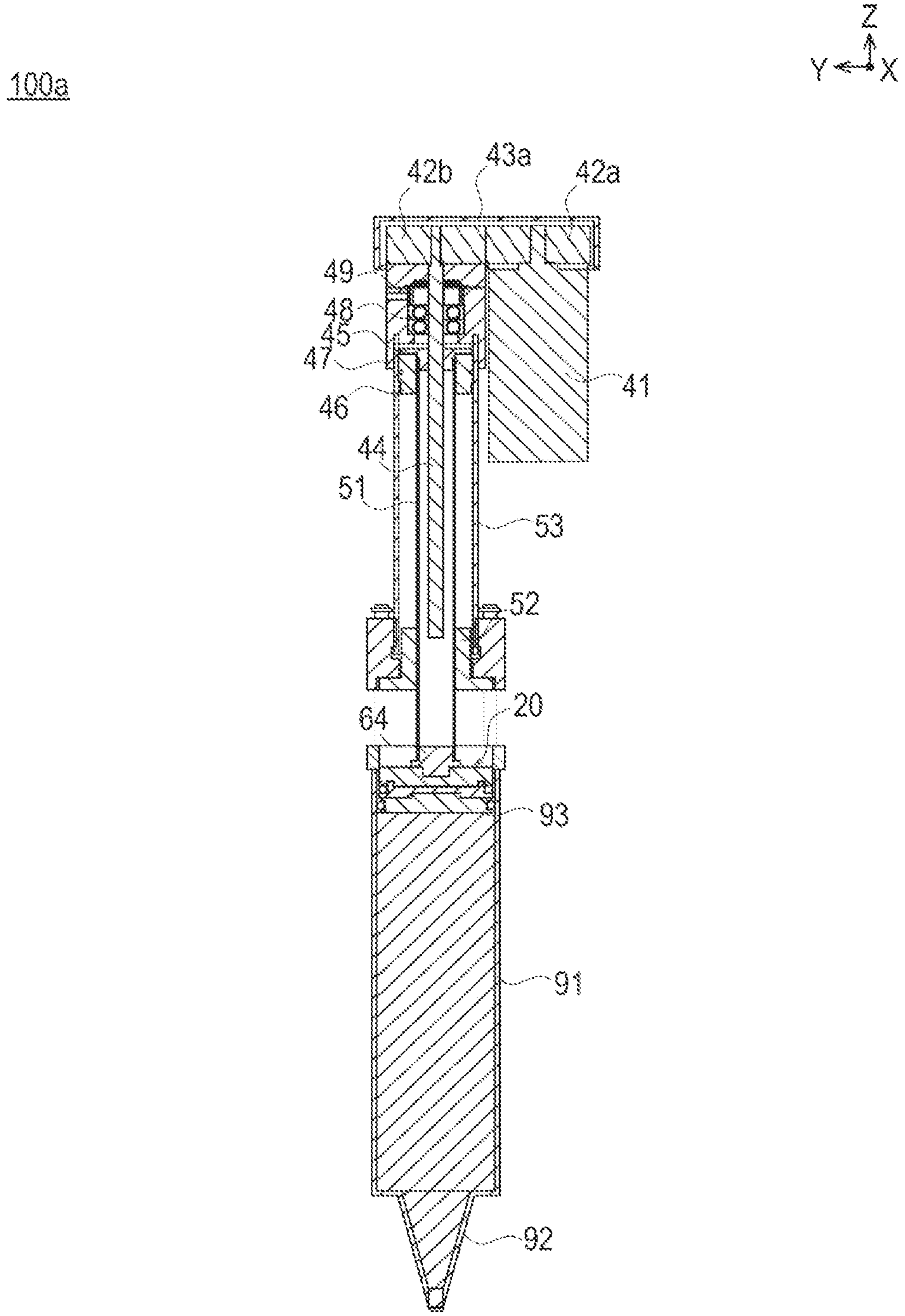
FIG. 8 is a sectional view illustrating a material application device according to a modification of FIG. 4.

The present invention is not limited only to the above-described embodiment, and various modifications are possible within the scope of the claims. FIG. 8 illustrates a material application device 100*a* according to a modification, and is a sectional view corresponding to FIG. 4. In the above-described embodiment, although the motor 41 is connected to the ball screw 44 through the coupling 42, and the motor 41 is disposed to be aligned with the ball screw 44, the material application device is not limited to this as long as the weight of the material application device can be suppressed.

Other than the above, the rotation of the motor 41 may be transmitted to the ball screw 44 through gears 42*a*, 42*b* constituting a pair of gears as shown in FIG. 8. In this case, the motor 41 is disposed adjacent to the ball screw 44 in the radial direction r of the ball screw 44. The gears 42*a*, 42*b* constituting the pair of gears are accommodated in a gear case 43*a*, the gear 42*a* is connected to the rotation shaft of the motor 41, and the gear 42*b* is connected to the rotation shaft of the ball screw 44. Since other configurations are the same as in FIG. 4, descriptions will be omitted.

With such a configuration, it is also possible to suppress the whole device becoming heavier in weight compared to a case in which the pusher is driven without using a mechanism for supplying air, with the use of the motor and the ball screw. Furthermore, in the modification shown in FIG. 8, although the gears 42*a*, 42*b* constituting the pair of gears transmit the rotation from the motor 41 to the ball screw, the rotation (driving force) of the motor may be transmitted to the ball screw through a belt instead of the gears.

The present application is based on Japanese Patent Application No. 2019-232748 filed on Dec. 24, 2019, the disclosed content of which is referenced herein in its entirety.

REFERENCE SIGNS LIST

100: material application device
10: dispenser
20: pushing part
21: pusher (pushing member)
22: sealing member
23: clamping member
30: driving part
40: first driving part
41: motor
44: ball screw
45: nut
46: piston
47: bearing case (case member)
51: spline member
53: cylinder tube (tube)
60: second driving part
61: packing case (case member)
80: moving part
81: first moving part
82: second moving part
83: third moving part
90: storage container
91: filling part
93: plunger
r: radial direction
S: inner space
X: depth direction
Y: width direction
Z: height direction (longitudinal direction of ball screw)

The invention claimed is:

1. A material application device comprising:

a storage container including a discharging part and a space containing a material;

a plunger configured to be movable in the space of the storage container to discharge the material from the discharging part;

a pushing part capable of attaching the plunger of the storage container; and a driving part for imparting a driving force for moving the pushing part, wherein the driving part comprises:

a motor capable of imparting a driving force to the pushing part;

an elongated ball screw that rotates by receiving rotation of the motor;

a nut that is screwed with the elongated ball screw, and is movable in a longitudinal direction of the elongated ball screw with the rotation of the elongated ball screw;

a spline member capable of moving the pushing part by being coupled with the pushing part and moving in the longitudinal direction together with the nut;

a bearing case having a hole which provides communication from outside to an inner space, and allows rotation and insertion of the elongated ball screw therethrough; and a cylinder tube that is disposed adjacent to the bearing case, and is connectable to the bearing case, wherein the inner space, which allows the elongated ball screw to rotate by flow in of a fluid from the hole, is formed by connecting the case member and the tube, the fluid being different from the material, and the elongated ball screw rotates by the rotation of the motor or the flow in of the fluid from the hole of the bearing case to move the nut and the spline member in the longitudinal direction.

2. The material application device according to claim 1, wherein the pushing part and the driving part are mounted on a machine that is relatively movable with respect to a workpiece onto which the material is to be applied.

3. The material application device according to claim 1, wherein the pushing part comprises a pushing member, the pushing member has a body configured to be able to be fitted with the plunger, the body has a hole in a middle, and the hole of the pushing member is configured to communicate with the plunger in a state where the pushing member is attached to the plunger.

* * * * *